Feb. 21, 1967 C. H. COWLES 3,305,098
FILTER
Filed Nov. 17, 1961
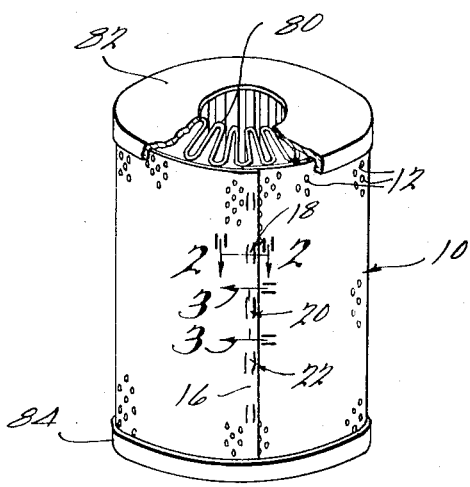
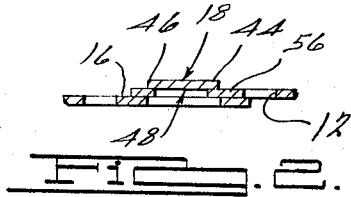
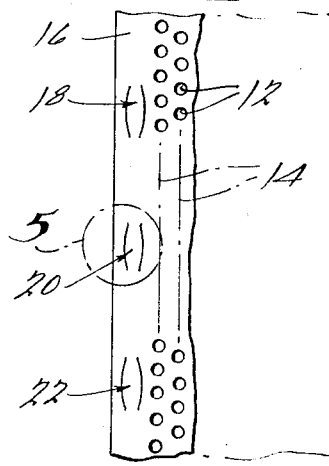
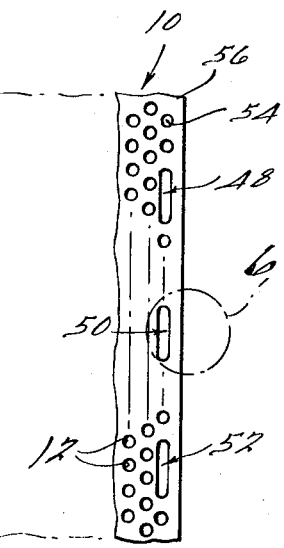
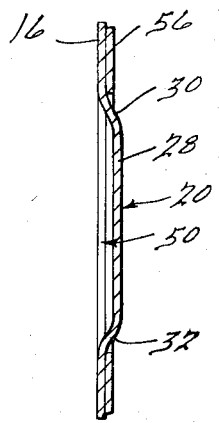
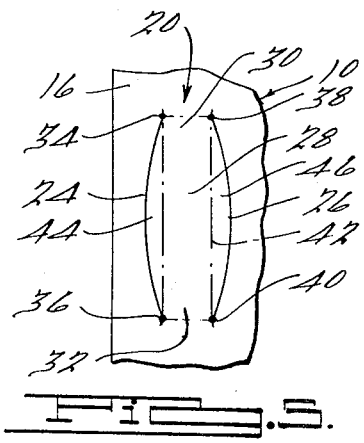
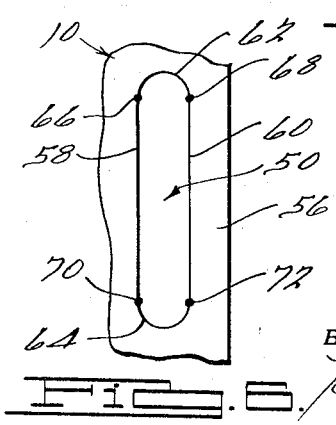
INVENTOR.
Craig H. Cowles
BY
Harness, Dickey & Pierce
ATTORNEYS

United States Patent Office 3,305,098
Patented Feb. 21, 1967

3,305,098
FILTER
Craig H. Cowles, Racine, Wis., assignor to Walker Manufacturing Company, Racine, Wis., a corporation of Delaware
Filed Nov. 17, 1961, Ser. No. 153,172
8 Claims. (Cl. 210—484)

This invention relates to means for fastening sections of material to one another, and more particularly to means for securing the ends of a perforated filter shield to one another.

Replaceable filter cartridges for filtering internal combustion engine lubricants or the like are commonly provided with a cylindrical shield element which surrounds the filter body. The filter shields are conventionally made from flat sheet material, such as paper board or the like, which is perforated to permit flow to and from the filter unit. The shields are formed into cylindrical shape and secured circumjacent the outer periphery of the filter unit. The perforations in the shields commonly take the form of parallel rows of relatively small diameter holes which extend over the entire surface of the shield. This invention relates specifically to the problem of fastening the ends of the flat sheet material to one another to obtain and retain the cylindrical form of the filter shield.

It is an object of the present invention to provide means for fastening sections of material to one another in a new and improved manner. It is a further object of the present invention to provide means for securing the ends of a filter shield to one another in a convenient and economical manner, and yet provide sufficient fastening strength to retain the parts in the desired position. Another object of the present invention is to provide fastening means for securing a filter shield in a cylindrical form by the use of locking means formed integrally in, and being part of, the conventional filter shield. A further object of the present invention is to provide fastening means for securing sections of material to one another which are integrally formed on a conventional filter shield structure in an economical manner while providing sufficient fastening strength to insure that the filter shield will not come apart under normal operating conditions. Other objects and advantages of the present invention will be apparent or become apparent by reference to the following detailed description and the accompanying drawings wherein:

FIGURE 1 is a perspective view of filter apparatus embodying the principles of the present invention;

FIGURE 2 is a sectional view taken along the line 2–2 in FIGURE 1;

FIGURE 3 is a sectional view taken along the line 3—3 in FIGURE 1;

FIGURE 4 is a plan view of a sheet of filter shield material in its normal preassembly condition;

FIGURE 5 is an enlarged view of a portion of the sheet shown in FIGURE 4 as indicated by the dashed line 5; and FIGURE 6 is an enlarged view of another portion of the sheet shown in FIGURE 4 as indicated by the dashed line 6.

Referring now to FIGURES 4–6, a section of flat shield material 10 having a plurality of perforations 12 arranged in parallel rows 14 is illustrated. The shield material may be of any conventional composition. In the preferred embodiment the material is of paper board composition, or the like, having a degree of flexibility. One end 16 of the section of material is not perforated and forms a continuous solid strip of material. A plurality of locking tabs 18, 20, 22 are integrally formed in the solid end portion 16. As shown in FIGURE 5, each of the locking tabs is formed by a pair of oppositely outwardly curved slits 24, 26 which defines a central tab portion 28 of maximum width and end portions 30, 32 of reduced width. The end portions are integrally connected to the solid portion 16 of the sheet material. The slits 24, 26 terminate at points 34, 36, and 38, 40, respectively, which define an imaginary rectangle 42 indicated by the dot dash lines. The portions of the tabs 44, 46, defined by the curved slits 24, 26 and the imaginary rectangle 42, provide flap portions for a purpose to be hereinafter described.

Referring again to FIGURE 4, a plurality of locking slots 48, 50, 52 are formed in the end row 54 of perforations on the other end 56 of the sheet of material by removing a series of adjacent perforations. As shown in FIGURE 6, the slots are defined by parallel side walls 58, 60 which are connected by curved end walls 62, 64. The curved walls connect to the parallel side walls at points 66, 68 and 70, 72, respectively. The spatial location of the points 66, 68, 70, 72 is substantially identical to the spatial location of the points 34, 36, 38, 40. The width of the slots—the distance between the parallel side walls 58, 60—is substantially equal to the width of the imaginary rectangle 42. In order to obtain maximum retention characteristics, the width of the slots should be as nearly equal to the width of the imaginary rectangle 42 as possible. However, in many cases, it may be desirable to reduce the width of the imaginary rectangle 42 relative to the width of the slots to facilitate assembly of the apparatus. Accordingly, the width of the slots may be substantially equal to or less than the width of the imaginary rectangle 42.

In the assembled position shown in FIGURES 1–3, the sheet of material is bent into cylindrical form with the end portions 16 and 56 overlapping one another and secured circumjacent a conventional filter element 80. The filter element and shield are subsequently mounted between end plates 82, 84 of a conventional filter assembly. The shield is held in a cylindrical form by means of an interlock as hereinafter described. It may be seen that the tabs and the slots are aligned relative to one another in the assembled position of the shield. The sheet of material may be locked or fastened in the assembled position by forcing the tabs into and through the corresponding slots. By exerting force on the central portion 28 of each of the tabs, the tabs may be forced through the slots by bending of the flap portions 44, 46. Since the material has an inherent resiliency, the tabs may be forced through the holes without damage thereto. When the tabs have been forced through the holes, the flap portions 44, 46 spring back to substantially their original position and engage the surface areas adjacent to the parallel side walls of the slots. It should be noted that as the tabs are forced through the slots, the flap portions are bent inwardly toward one another in a direction opposite to the direction of force application. When the central portions 28 of the tabs have been inserted completely through the slots and the flap portions 44, 46 have returned to substantially their original positions, an interlock is obtained between the ends of the material which will retain the material in the cylindrical form. It should be further noted that any forces tending to separate the sections and break the interlock will be exerted on the flap portions 44, 46 in a direction opposite to the direction in which the flap portions were originally bent. Consequently, the initial bending of the flap portions has relatively little effect on the strength of the interlock since forces exerted on the interlock are in an opposite direction and tend to move the flaps in a direction in which they have not previously been distorted.

It should be further noted that the edges of the locking tab are continuous curves and thereby reduce any sharp corners which would tend to produce stress concentration areas and tend to weaken the interlock obtained. The ends of the slits may be slightly outwardly flared if desired in order to reduce stress concentrations at the connection between the tabs and the sheet of material.

Although the aforedescribed fastening means is particularly well adapted for use with a filter shield and has particular advantages relative thereto, it is possible for the fastening means to be used in other environments and applications. The number and size of the tabs and slots may be varied as desired. Those modifications and changes in the details of construction and the arrangements of the various parts which embody the principles of the invention are intended to be included within the scope of the appended claims, except insofar as limited by the prior art.

What is claimed is:

1. Means for fastening sections of material to one another and comprising: slot means formed in one of said sections, said slot means being defined by a pair of oppositely located edges, continuous one-piece tab means formed in the other of said sections, said tab means being defined by a pair of oppositely curved spaced slits, said tab means having a central portion of maximum width between said curved slits which is greater than the width of said slot means and having end portions integrally connected to said other section which are substantially equal to or less than the width of said slot means, said central portion of said tab means being inserted through said slot means and retained therein by surface engagement of the outer surface areas of said central portion along said slits with the surface area of said one section on opposite sides of said slot means along said edges of said slot means.

2. The means for fastening sections of material to one another as defined in claim 1 and wherein the edges of said slot means terminate at points substantially defining a rectangle, the long sides of said rectangle being substantially equal to the length of said slot means and the short side of said rectangle being substantially equal to the width of said slot means, the points forming each long side of said rectangle being connected by an outwardly curved edge.

3. The means for fastening sections of material to one another as defined in claim 1 and wherein the ends of said slits terminate at points substantially defining a rectangle, the long side of said rectangle being substantially equal to the length of said slot means and the short side of said rectangle being substantially equal to the width of said slot means, the points forming each long side of the rectangle being connected by one of said outwardly curved slits to define flaps on said tab means which are adapted to be bent inwardly toward one another as said tab means are inserted into said slot means opposite to the direction of force application to said tab means and are adapted to be returned to the original unbent position after said tab means have been inserted through said slot means to form an interlock.

4. Means for fastening the ends of a piece of material to one another and comprising: a series of parallel elongated slots having parallel side surfaces and rounded end surfaces provided on one end of said piece of material, a correspondingly located and spaced series of tab portions integrally formed on the other end of said piece of material, said tab portions being defined by a pair of oppositely outwardly curved slits having terminal points located substantially in line with the side edges of said slots to define oppositely outwardly curved flap portions extending between said terminal points whereby an oval-shaped locking tab is provided for each slot which may be outwardly displaced relative to the plane of said piece of material and inserted through said slot to abut the opposite side of said other end of said piece of material and prevent displacement of the one end of said piece of material relative to the other end.

5. Means for fastening the ends of a piece of material to one another and comprising a series of parallel elongated slots having parallel side surfaces and rounded end surfaces provided at one location on said piece of material, a series of correspondingly located and spaced slitted portions of material provided at another location on said piece of material, said slitted portions being defined by slits having terminal points located substantially in line with the side edges of said slots, said slits being oppositely outwardly curved between said terminal points whereby continuous one-piece locking tabs are provided which are integrally connected to said piece of material at opposite ends and may be outwardly displaced and inserted through said slots by compressing portions of said slitted portions during insertion through said slots and expanding the compressed portions of said slitted portions on the opposite side of said slots to provide surface engagement therebetween and prevent displacement of the associated portion of the piece of material relative to one another.

6. In a paper filter shell or the like, having abutting and overlapped end portions, integral continuous one-piece elongated tab means formed in one of said end portions, opposite ends of said tab means being integrally connected to said one of said end portions and said tab means being continuous between said opposite ends, the side portions of said tab means between said opposite ends being severed from said one of said end portions along outwardly curved lines to define tab means having a maximum width center portion and minimum width opposite ends with the tab means gradually changing in width between said maximum width center portion and said minimum width opposite ends, elongated slot means having a length approximately equal to the length of said tab means and a width less than said central portion and greater than said opposite ends whereby said tab means may be resiliently deflected through said slot means and said central portion of said tab means extending through said slot means and abuttingly engaging opposite sides of said slot means to hold said end portions in abutting and overlapped relationship.

7. The invention as defined in claim 6 and wherein said slot means have parallel spaced side wall portions and arcuate spaced end wall portions.

8. The invention as defined in claim 7 and wherein the terminal points of said side portions of said tab means aligned with and correspond to the intersections of said parallel side wall portions and said arcuate end wall portions of said slot means.

References Cited by the Examiner

UNITED STATES PATENTS

| 1,333,719 | 3/1920 | Jorgensen | 210—497 |
| 2,084,906 | 6/1937 | Graham | 217—3 |
| 2,749,265 | 6/1956 | Fricke et al. | 229—14 |

FOREIGN PATENTS

| 410,845 | 3/1910 | France. |

REUBEN FRIEDMAN, *Primary Examiner.*

H. L. MARTIN, *Examiner.*

S. ZAHARNA, *Assistant Examiner.*